US012800935B2

(12) United States Patent
Schultz

(10) Patent No.: US 12,800,935 B2
(45) Date of Patent: Nov. 17, 2026

(54) DUAL INDEX WAVEGUIDE STACK

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 171 days.

(21) Appl. No.: 18/865,223

(22) PCT Filed: May 10, 2023

(86) PCT No.: PCT/US2023/021670
§ 371 (c)(1),
(2) Date: Nov. 12, 2024

(87) PCT Pub. No.: WO2023/220133
PCT Pub. Date: Nov. 16, 2023

(65) Prior Publication Data

US 2025/0334809 A1 Oct. 30, 2025

Related U.S. Application Data

(60) Provisional application No. 63/341,360, filed on May 12, 2022.

(51) Int. Cl.

| | |
|---|---|
| ***G02B 27/01*** | (2006.01) |
| ***G02B 5/18*** | (2006.01) |
| ***G02B 27/00*** | (2006.01) |

(52) U.S. Cl.
CPC ....... *G02B 27/0172* (2013.01); *G02B 5/1819* (2013.01); *G02B 5/1861* (2013.01);
(Continued)

(58) Field of Classification Search
CPC ......................... G02B 27/0172; G02B 5/1819; G02B 5/1861; G02B 5/1871; G02B 27/0081; G02B 2027/0178
See application file for complete search history.

(56) References Cited

U.S. PATENT DOCUMENTS

| | | | |
|---|---|---|---|
| 2017/0102544 | A1 | 4/2017 | Vallius |
| 2019/0227317 | A1 | 7/2019 | Trail et al. |

(Continued)

FOREIGN PATENT DOCUMENTS

| | | | |
|---|---|---|---|
| JP | 2015194654 A | 11/2015 | |
| JP | 2020531905 A | 11/2020 | |
| WO | 2020081087 A1 | 4/2020 | |

*Primary Examiner* — Phu Vu

(74) *Attorney, Agent, or Firm* — Harter Secrest & Emery LLP; Jacob D. Merrill, Esq.

(57) ABSTRACT

An image light guide system for conveying a virtual image that includes a first waveguide having a first refractive index and a second waveguide having a second refractive index. The first waveguide includes diffractive optics arranged to in-couple and out-couple image-bearing light beams of a first wavelength range. The second waveguide includes diffractive optics arranged to in-couple and out-couple image-bearing light beams of at least a second wavelength range. An image light guide system for conveying a virtual image that includes a first waveguide having a first refractive index and a second waveguide having a second refractive index. The first waveguide includes diffractive optics arranged to in-couple and out-couple image-bearing light beams of a first wavelength range. The second waveguide includes diffractive optics arranged to in-couple and out-couple image-bearing light beams of at least a second wavelength range.

16 Claims, 12 Drawing Sheets

(52) U.S. Cl.
CPC ........ *G02B 5/1871* (2013.01); *G02B 27/0081* (2013.01); *G02B 2027/0178* (2013.01)

(56) References Cited

U.S. PATENT DOCUMENTS

| | | | | |
|---|---|---|---|---|
| 2020/0088932 | A1 | 3/2020 | Schultz et al. | |
| 2020/0209630 | A1 | 7/2020 | Schultz et al. | |
| 2020/0278543 | A1 | 9/2020 | Schultz et al. | |
| 2021/0063619 | A1 | 3/2021 | Yoon et al. | |
| 2021/0239984 | A1 | 8/2021 | Popovich et al. | |
| 2021/0263324 | A1 | 8/2021 | Kim et al. | |
| 2023/0324595 | A1* | 10/2023 | Drazic ................. | G02B 6/0076 385/37 |

* cited by examiner

DUAL INDEX WAVEGUIDE STACK

TECHNICAL FIELD

The present disclosure relates generally to electronic displays and more particularly to displays utilizing image light guides with diffractive optics to convey image-bearing light to a viewer.

BACKGROUND

Head-Mounted Displays (HMDs) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

Although conventional image light guide arrangements have provided significant reduction in bulk, weight, and overall cost of near-eye display optics, further improvements are needed. In some instances, image resolution is constrained by a reduction in the bulk and cost of conventional image light guide arrangements. Similarly, diffraction and propagation of certain wavelengths of light can underperform in a conventional image light guide arrangement. Thus, there is a need for an image light guide system operable to produce the desired virtual image brightness and resolution while managing the bulk and cost of the system.

SUMMARY

In a first exemplary embodiment, the present disclosure provides an image light guide system for conveying a virtual image including, a first waveguide having a first refractive index, a first in-coupling diffractive optic formed along the first waveguide, wherein the first in-coupling diffractive optic is arranged to diffract image-bearing light beams of a first wavelength range into the first waveguide in an angularly encoded form, a first out-coupling diffractive optic formed along the first waveguide, wherein the first out-coupling diffractive optic is arranged to replicate the image-bearing light beams of the first wavelength range in at least one direction and direct the replicated image-bearing light beams from the first waveguide in an angularly decoded form, a second waveguide having a second refractive index, a second in-coupling diffractive optic formed along the second waveguide, wherein the second in-coupling diffractive optic is arranged to diffract image-bearing light beams of a second wavelength range into the second waveguide in an angularly encoded form, a second out-coupling diffractive optic formed along the second waveguide, wherein the second out-coupling diffractive optic is arranged to replicate the image-bearing light beams of the second wavelength range of in at least one direction and direct the replicated image-bearing light beams from the second waveguide in an angularly decoded form. In one example embodiment, the image light guide system includes a third in-coupling diffractive optic formed along the second waveguide, wherein the third in-coupling diffractive optic is arranged to diffract image-bearing light beams of a third wavelength range into the second waveguide in an angularly encoded form, and a third out-coupling diffractive optic formed along the second waveguide, wherein said third out-coupling diffractive optic is arranged to replicate the image-bearing light beams of the third wavelength range in at least one direction and direct the replicated image-bearing light beams from the second waveguide in an angularly decoded form.

In an exemplary embodiment, the first waveguide comprises a lower refractive index material than the second waveguide.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
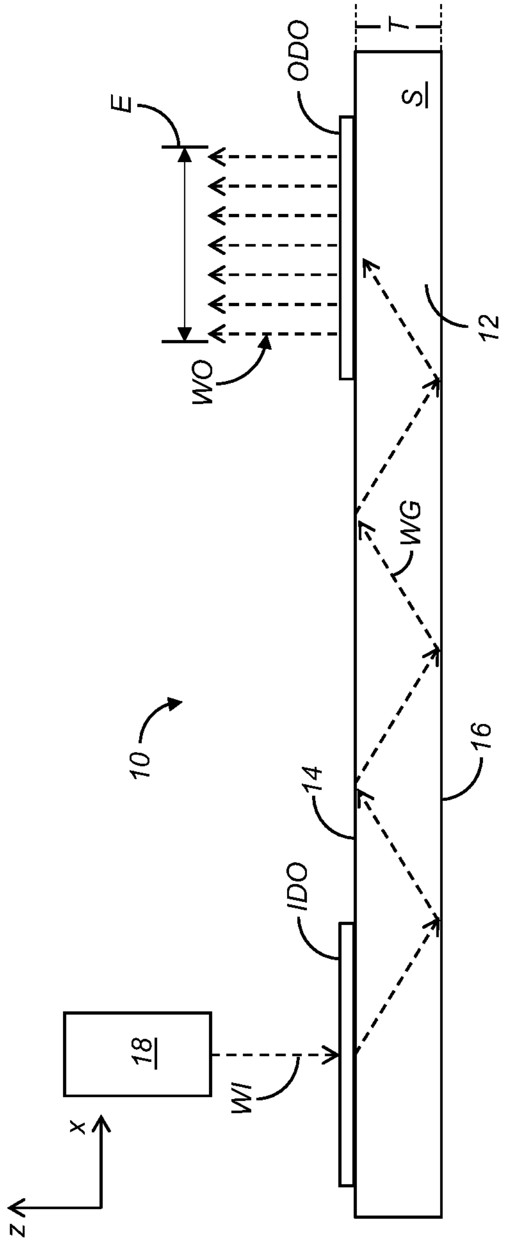
FIG. 1 shows a simplified cross-sectional view of an image light guide showing the replication of an image-bearing beam along the direction of propagation for expanding one direction of an eyebox.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where used herein, the terms "first", "second", and so on, do not necessarily denote any ordinal, sequential, or priority relation, but are simply used to more clearly distinguish one element or set of elements from another, unless specified otherwise.

Where used herein, the terms "viewer", "operator", "observer", and "user" are considered equivalents and refer to the person, or machine, who wears and/or views images using a device having an imaging light guide.

Where used herein, the term "set" refers to a non-empty set, as the concept of a collection of elements or members of a set is widely understood in elementary mathematics. Where used herein, the term "subset", unless otherwise explicitly stated, refers to a non-empty proper subset, that is, to a subset of the larger set, having one or more members. For a set S, a subset may comprise the complete set S. A "proper subset" of set S, however, is strictly contained in set S and excludes at least one member of set S.

Where used herein, the terms "coupled," "coupler," or "coupling" in the context of optics refer to a connection by which light travels from one optical medium or device to another optical medium or device.

Where used herein, the terms "wavelength band" and "wavelength range" are equivalent and have their standard connotation as used by those skilled in the art of color imaging and refer to a continuous range of light wavelengths that are used to represent polychromatic images.

Where used herein, the term "beam expansion" is intended to mean replication of a beam via multiple encounters with an optical element to provide exit pupil expansion in one or more directions. Similarly, as used herein, to "expand" a beam, or a portion of a beam, is intended to mean replication of a beam via multiple encounters with an optical element to provide exit pupil expansion in one or more directions.

One skilled in the relevant art will recognize that the elements and techniques described herein can be practiced without one or more of the specific details, or with other methods, components, materials, etc. In some instances, well-known structures, materials, or operations are not shown or described in detail to avoid obscuring certain aspects of the present disclosure. Reference throughout the specification to "one embodiment" or "an embodiment" means that a particular feature, structure, or characteristic described in connection with the embodiment is included in at least one embodiment of the present disclosure. Thus, the appearance of the phrase "in one embodiment" or "in an embodiment" throughout the specification is not necessarily referring to the same embodiment. However, the particular features, structures, or characteristics described may be combined in any suitable manner in one or more embodiments.

An optical system, such as a HMD, can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

An image light guide may utilize image-bearing light from a light source such as a projector to display a virtual image. For example, collimated, relatively angularly encoded, light beams from a projector are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief. After propagating along the waveguide, the diffracted light can be directed back out of the waveguide by a similar output coupling such as an out-coupling diffractive optic, which can be arranged to provide pupil expansion along at least one direction of the virtual image. In addition, a turning grating can be positioned on/in the waveguide to provide pupil expansion in an orthogonal direction of the virtual image. The image-bearing light output from the waveguide provides an expanded eyebox for the viewer.

FIG. 1 is a schematic diagram showing a simplified cross-sectional view of one conventional configuration of an image light guide system 10. Image light guide system 10 includes a planar image light guide 12, an in-coupling diffractive optic IDO, and an out-coupling diffractive optic ODO. The image light guide 12 includes a transparent substrate S, which can be made of optical glass or plastic, with plane-parallel front and back surfaces 14 and 16. In this example, the in-coupling diffractive optic IDO is shown as a transmissive-type diffraction grating arranged on, in, or otherwise engaged with the front surface 14 of the image light guide 12. However, in-coupling diffractive optic IDO could alternately be a reflective-type diffraction grating or other type of diffractive optic, such as a volume hologram or other holographic diffraction element, that diffracts incoming image-bearing light beams WI into the image light guide 12. The in-coupling diffractive optic IDO can be located on, in, or otherwise engaged with front surface 14 or back surface 16 of the image light guide 12 and can be of a transmissive or reflective-type in a combination that depends upon the direction from which the image-bearing light beams WI approach the image light guide 12.

When used as a part of a near-eye or head-mounted display system, the in-coupling diffractive optic IDO of the conventional image light guide system 10 couples the image-bearing light beams WI from a real, virtual or hybrid image source 18 into the substrate S of the image light guide 12. Any real image or image dimension formed by the image source 18 is first converted into an array of overlapping, angularly related, collimated beams encoding the different positions within a virtual image for presentation to the in-coupling diffractive optic IDO. Typically, the rays within each bundle forming one of the angularly related beams extend in parallel, but the angularly related beams are relatively inclined to each other through angles that can be defined in two angular dimensions corresponding to linear dimensions of the image.

Once the angularly related beams engage with the in-coupling diffractive optic IDO, at least a portion of the image-bearing light beams WI are diffracted (generally through a first diffraction order) and thereby redirected by in-coupling diffractive optic IDO into the planar image light guide 12 as angularly encoded image-bearing light beams WG for further propagation along a length dimension x of the image light guide 12 by total internal reflection (TIR) between the plane-parallel front and back surfaces 14 and 16. Although diffracted into a different combination of angularly related beams in keeping with the boundaries set by TIR, the image-bearing light beams WG preserve the image information in an angularly encoded form that is derivable from the parameters of the in-coupling diffractive optic IDO. The out-coupling diffractive optic ODO receives the encoded image-bearing light beams WG and diffracts (also generally through a first diffraction order) at least a portion of the image-bearing light beams WG out of the image light guide 12, as image-bearing light beams WO, toward a nearby region of space referred to as an eyebox E, within which the transmitted virtual image can be seen by a viewer's eye 5 or other optical component. The out-coupling diffractive optic ODO can be designed symmetrically with respect to the in-coupling diffractive optic IDO to restore the original angular relationships of the image-bearing light beams WI among outputted angularly related beams of the image-bearing light beams WO. In addition, the out-coupling diffractive optic ODO can modify the original field points' positional angular relationships producing an output virtual image at a finite focusing distance.

However, to increase one dimension of overlap among the angularly related beams populating the eyebox E (defining the size of the region within which the virtual image can be seen), the out-coupling diffractive optic ODO is arranged together with a limited thickness T of the image light guide 12 to encounter the image-bearing light beams WG multiple times and to diffract only a portion of the image-bearing light beams WG upon each encounter. The multiple encounters along the length (e.g., a first direction) of the out-coupling diffractive optic ODO have the effect of replicating the image-bearing light beams WG and enlarging or expanding at least one dimension of the eyebox E where the replicated beams overlap. The expanded eyebox E decreases sensitivity to the position of a viewer's eye 5 for viewing the virtual image.

The out-coupling diffractive optic ODO is shown as a transmissive-type diffraction grating arranged on or secured to the front surface 14 of the image light guide 12. However, like the in-coupling diffractive optic IDO, the out-coupling diffractive optic ODO can be located on, in, or otherwise engaged with the front or back surface 14 or 16 of the image light guide 12 and can be of a transmissive or reflective-type in a combination that depends upon the direction through which the image-bearing light beams WG is intended to exit the image light guide 12. In addition, the out-coupling diffractive optic ODO could be formed as another type of diffractive optic, such as a volume hologram or other holographic diffraction element, that diffracts propagating image-bearing light beams WG from the image light guide 12 as the image-bearing light beams WO propagating toward the eyebox E.

Figure 2:
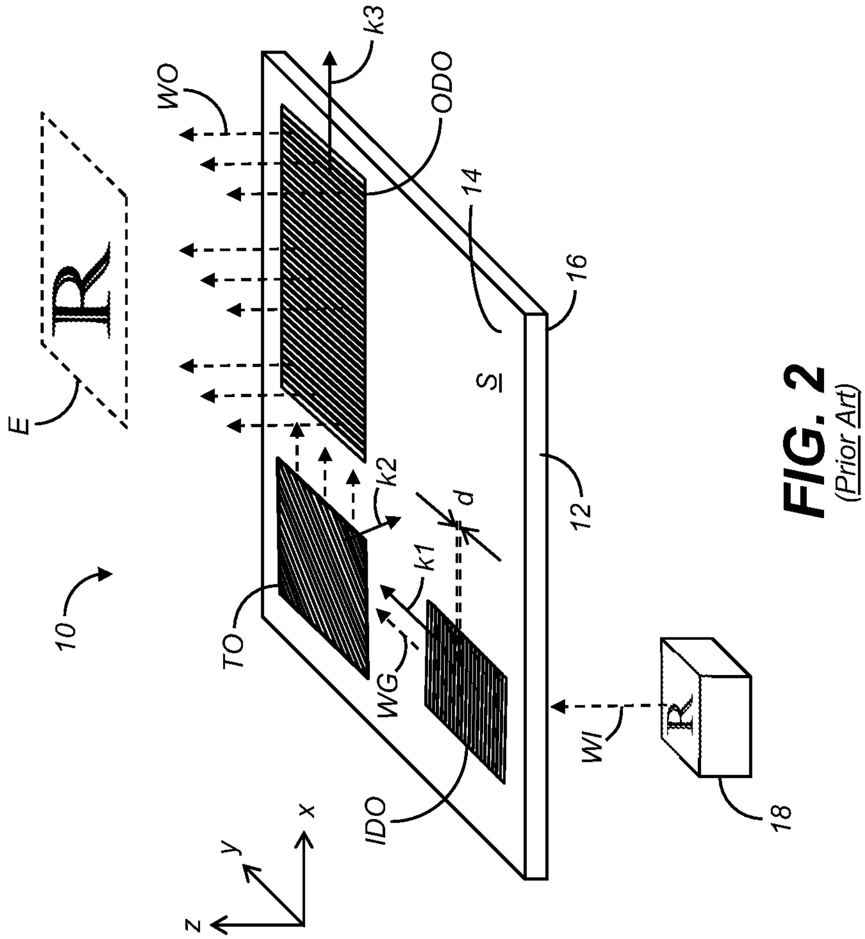
FIG. 2 (Prior Art)
FIG. 2 shows a perspective view of an image light guide with a turning grating showing the expansion of an image-bearing beam perpendicular to the direction of propagation for expanding a second direction of an eyebox.

FIG. 2 illustrates a perspective view of a conventional image light guide system 10 arranged for expanding the eyebox E in two dimensions, i.e., along both x- and y-axes of the intended image. To achieve a second dimension of eyebox expansion, the in-coupling diffractive optic IDO is oriented to diffract at least a portion of image-bearing light beams WG along a grating vector k1 along the image light guide 12 toward an intermediate turning optic TO, whose grating vector k2 is oriented to diffract at least a portion of the image-bearing light beams WG in a reflective mode along the image light guide 12 toward the out-coupling diffractive optic ODO. It should be appreciated that only a portion of the image-bearing light beams WG are diffracted by each of the multiple encounters with intermediate turning optic TO, thereby laterally replicating each of the angularly related beams of the image-bearing light beams WG as they approach the out-coupling diffractive optic ODO. The intermediate turning optic TO redirects the image-bearing light beams WG toward the out-coupling diffractive optic ODO (having a grating vector k3) for longitudinally replicating the angularly related beams of the image-bearing light beams WG in a second direction before exiting the image light guide 12 as the image-bearing light beams WO. Grating vectors, such as the depicted grating vectors k1, k2, and k3, extend within a parallel plane of the image light guide 12 in respective directions that are normal to the diffractive features (e.g., grooves, lines, or rulings) of the diffractive optics and have respective magnitudes inverse to the period or pitch d (i.e., the on-center distance between the diffractive features) of the diffractive optics IDO, TO, and ODO.

As shown in FIG. 2, in-coupling diffractive optic IDO receives the incoming image-bearing light beams WI containing a set of angularly related beams corresponding to individual pixels or equivalent locations within an image generated by the image source 18, such as a projector. A full range of angularly encoded beams for producing a virtual image can be generated by a real display together with collimating optics or other optical components, by a beam scanner for more directly setting the angles of the beams, or by a combination such as a one-dimensional real display used with a scanner. In this configuration, the image light guide 12 outputs a replicated set of angularly related beams (replicated in two dimensions) by providing multiple encounters of the image-bearing light beams WG with both the intermediate turning optic TO and the out-coupling diffractive optic ODO in different orientations. In the depicted orientation of the image light guide 12, the intermediate turning optic TO provides eyebox expansion in a first dimension, e.g., the y-axis direction, and the out-coupling diffractive optic ODO provides a similar eyebox expansion in a second dimensions, e.g., the x-axis direction. The relative orientations and respective periods d of the diffractive features of the in-coupling optic IDO, intermediate turning optic TO, and out-coupling diffractive optic ODO provide for eyebox expansion in two dimensions while preserving the intended relationships among the angularly related beams of the image-bearing light beams WI that are output from the image light guide system 10 as the image-bearing light beams WO. It should be appreciated that the periods d of the in-coupling diffractive optic IDO, the intermediate turning optic TO, and the out-coupling diffractive optic ODO, can each include diffractive features having a common pitch d, where the common pitch d of each optic can be different.

In the configuration shown, while the image-bearing light beams WI input into the image light guide 12 are encoded into a different set of angularly related beams by the in-coupling diffractive optic IDO, the information required to reconstruct the image is preserved by accounting for the systematic effects of the in-coupling diffractive optic IDO.

The intermediate turning optic TO, located in an intermediate position between the in-coupling and out-coupling diffractive optics IDO and ODO, can be arranged so that it does not induce significant changes to the encoding of the image-bearing light beams WG. As such, the out-coupling diffractive optic ODO can be arranged in a symmetric fashion with respect to the in-coupling diffractive optic IDO, e.g., including diffractive features sharing the same period d. Similarly, the period of the intermediate turning optic TO can also match the common period of the in-coupling and out-coupling diffractive optics IDO and ODO. Although the grating vector k2 of the intermediate turning optic TO is shown oriented at 45 degrees with respect to the other grating vectors, which remains a possible orientation, the grating vector k2 of the intermediate turning optic TO can be oriented at 60 degrees to the grating vectors k1 and k3 of the in-coupling and out-coupling diffractive optics IDO and ODO in such a way that the image-bearing light beams WG are turned 120-degrees. By orienting the grating vector k2 of the intermediate turning optic TO at 60 degrees with respect to the grating vectors k1 and k3 of the in-coupling and out-coupling diffractive optics IDO and ODO, the grating vectors k1 and k3 of the in-coupling and out-coupling diffractive optics IDO and ODO are also oriented at 60 degrees with respect to each other. By basing the grating vector magnitudes on the common pitch shared by the in-coupling, intermediate turning, and out-coupling diffractive optics IDO, TO, and ODO, the three grating vectors k1, k2, and k3 (as directed line segments) form an equilateral triangle and sum to a zero vector magnitude, which avoids asymmetric effects that could introduce unwanted aberrations including chromatic dispersion. Such asymmetric effects can also be avoided by grating vectors k1, k2, and k3 that have unequal magnitudes in relative orientations at which the three grating vectors k1, k2, and k3 sum to a zero vector magnitude.

In a broader sense, the image-bearing light beams WI that are directed into the image light guide 12 are effectively encoded by the in-coupling diffractive optic IDO, whether the in-coupling optic IDO uses gratings, holograms, prisms, mirrors, or some other mechanism. Any reflection, refraction, and/or diffraction of light that takes place at the input should be correspondingly decoded by the output to re-form the virtual image that is presented to the viewer. Whether any symmetries are maintained among the intermediate turning optic TO, the in-coupling optic IDO, and out-coupling diffractive optic ODO, or whether any change to the encoding of the angularly related beams of the image-bearing light beams WI takes place along the image light guide 12, the intermediate turning optic TO and the in-coupling and out-coupling diffractive optics IDO and ODO can be related so that the image-bearing light beams WO that are output from the image light guide 12 preserve or otherwise maintain the original or desired form of the image-bearing light beams WI for producing the intended virtual image.

As shown in FIG. 2, the letter "R" represents the orientation of the virtual image that is visible to the viewer whose eye is positioned within the eyebox E. As shown, the orientation of the letter "R" in the represented virtual image matches the orientation of the letter "R" as encoded by the image-bearing light beams WI. A change in the rotation about the z axis or angular orientation of incoming image-bearing light beams WI with respect to the x-y plane causes a corresponding symmetric change in rotation or angular orientation of outgoing light from out-coupling diffractive optic (ODO). From the aspect of image orientation, the intermediate turning optic TO simply acts as a type of optical relay, providing one dimension of eyebox expansion through replication of the angularly encoded beams of the image-bearing light beams WG along one axis (e.g., along the y-axis) of the image. Out-coupling diffractive optic ODO further provides a second dimension of eyebox expansion through replication of the angularly encoded beams along another axis (e.g., along the x-axis) while maintaining the original orientation of the virtual image encoded by the image-bearing light beams WI. The intermediate turning optic TO is typically a slanted or square grating or, alternately, can be a blazed grating and is typically arranged on one of the plane-parallel front and back surfaces of the image light guide 12. It should be appreciated that the representation of the virtual image "R" as created by an image source is comprised of infinitely focused light that requires a lens (e.g., the lens in the human eye) to focus the image so that the orientations discussed above can be detected.

Together, the in-coupling, turning, and out-coupling diffractive optics IDO, TO, and ODO preferably preserve the angular relationships among beams of different wavelengths defining a virtual image upon conveyance by image light guide 12 from an offset position to a near-eye position of the viewer. While doing so, the in-coupling, turning, and out-coupling diffractive optics IDO, TO, and ODO can be relatively positioned and oriented in different ways to control the overall shape of the image light guide 12 as well as the overall orientations at which the angularly related beams can be directed into and out of the image light guide 12.

The present disclosure provides for an image light guide arrangement having improved polychromatic image-bearing light output intensity across the output aperture. More specifically, the present disclosure provides for, inter alia, a waveguide stack having a high index polymer waveguide and a low index polymer waveguide.

As illustrated in FIG. 3-11, in an example embodiment, an image light guide system 50 includes a first planar waveguide 100 having a first surface 102 and a second surface 104. The waveguide first surface 102 is positioned generally parallel with the waveguide second surface 104. A first in-coupling diffractive optic IDO1 is located on, in, or engaged with the first surface 102 or the second surface 104. Additionally, a first out-coupling diffractive optic ODO1 is formed on, in, or engaged with the first surface 102 or the second surface 104. In an example embodiment, the out-coupling diffractive optics ODO1, ODO2, are each a diffraction grating. In another example embodiment, the out-coupling diffractive optics ODO1, ODO2 are each a holographic diffraction element.

Figure 4:
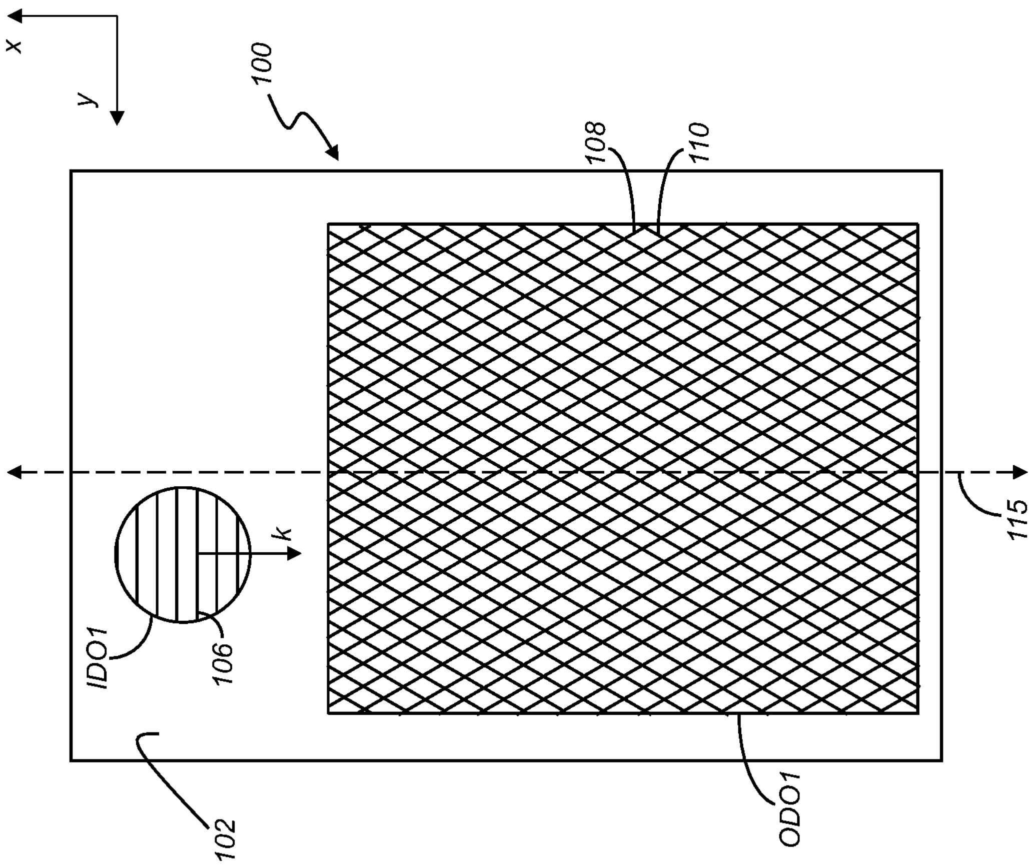
FIG. 4 shows a schematic top plan view of a first waveguide according to FIG. 3.

Referring now to FIG. 4, which illustrates a top plan view of an example embodiment of first planar waveguide 100, the first in-coupling diffractive optic IDO1 includes a first plurality of periodic diffractive structures 106. For example, the first in-coupling diffractive optic IDO1 may comprise a first set of periodic linear grating structures 106 oriented generally parallel with the y-axis. The first out-coupling diffractive optic ODO1 includes a second plurality of periodic diffractive structures 108 and a third plurality of periodic diffractive structures 110. For example, the second plurality of periodic diffractive structures 108 may comprise a second set of periodic linear grating structures 108 rotated or angularly offset relative to the x-axis 115 by a polar angle (measured from the x-axis 115) less than thirty degrees (e.g., 25°) and the third plurality of periodic diffractive structures 110 may comprise a third set of periodic linear grating structures 110 rotated or angularly offset relative to the x-axis 115 by a polar angle greater than sixty degrees, e.g., 65°. In an example embodiment, the second set of periodic linear grating structures 108 are rotated or angularly offset relative to the x-axis 115 by a polar angle of approximately 30° and the third set of periodic linear grating structures 110 are rotated or angularly offset relative to the x-axis 115 by a polar angle of approximately 150°. In another embodiment, the first set of periodic linear grating structures 106 are positioned generally parallel to an alternative axis that is not the y-axis, and further the second set of periodic linear grating structures 108 are rotated or angularly offset relative to an axis perpendicular to the alternative axis by a polar angle (measured from the perpendicular axis) less than thirty degrees (e.g., 25°) while the third set of periodic linear grating structures 110 are rotated or angularly offset relative to the alternative axis by a polar angle (measured from the perpendicular axis) greater than sixty degrees (e.g., 65°). The second and third sets of periodic diffractive structures 108, 110 are crossed and/or define different grating vectors. The second and third sets of periodic diffractive structures 108, 110 form a compound diffractive optic operable to replicate and out-couple image-bearing light in-coupled by the first in-coupling diffractive optic IDO1. The first set of periodic diffractive structures 106 comprises a first period, the second set of periodic diffractive structures 108 comprise a second period, and the third set of periodic diffractive structures 110 comprise a third period. In an example embodiment, the third period is equal to the second period, and the second period is equal to the first period. In an example embodiment, the first period, the second period, and the third period are each less than 50 nm.

As illustrated in FIGS. 3-10, in an example embodiment, the image light guide system 50 includes a second planar waveguide 200 having a first surface 202 and a second surface 204. The waveguide first surface 202 is positioned generally parallel with the waveguide second surface 204. A second in-coupling diffractive optic IDO2 is located on, in, or engaged with the first surface 202 and a third in-coupling diffractive optic IDO3 is located on, in, or engaged with the second surface 204. A second out-coupling diffractive optic ODO2 is formed on/in the first surface 202 and a third out-coupling diffractive optic ODO3 is formed on, in, or engaged with the second surface 204. In an example embodiment, the first in-coupling diffractive optic IDO1 is located substantially co-axial with the second in-coupling diffractive optic IDO2 with respect to an imaginary axis arranged through the first and second surface 102, 104 of the first planar waveguide 100 and through the first and second surface 202, 204 of the second planar waveguide 200. It should be appreciated that second in-coupling diffractive optic IDO2, third in-coupling diffractive optic IDO3, second out-coupling diffractive optic ODO2, and third out-coupling diffractive optic ODO3 can be formed, on, in, or engaged with either first surface 202 or second surface 204.

Figure 5:
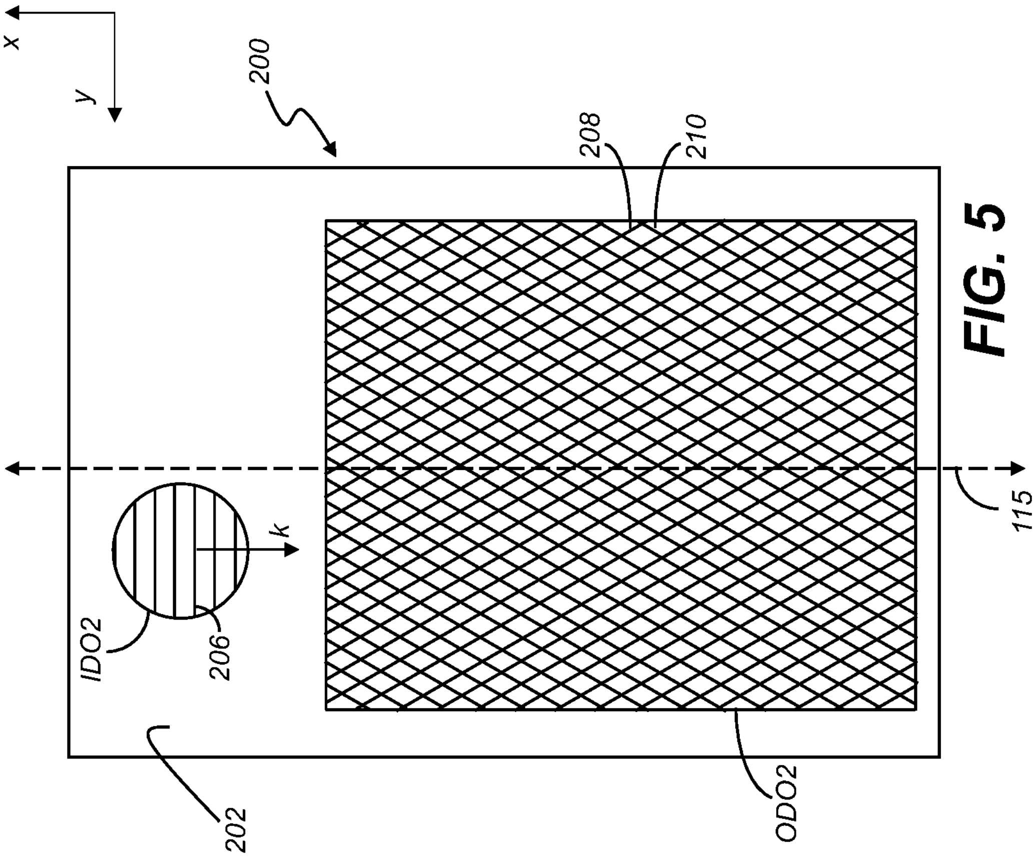
FIG. 5 shows a schematic top plan view of a second waveguide according to FIG. 3.

Referring now to FIG. 5, which illustrates a top plan view of an example embodiment of second planar waveguide 200, the second in-coupling diffractive optic IDO2 includes a fourth plurality of periodic diffractive structures 206. For example, the second in-coupling diffractive optic IDO2 may comprise a fourth set of periodic linear grating structures 206 positioned generally parallel with the y-axis. The second out-coupling diffractive optic ODO2 includes a fifth plurality of periodic diffractive structures 208 and a sixth plurality of periodic diffractive structures 210. For example, the fifth plurality of periodic diffractive structures 208 may comprise a set of periodic linear grating structures rotated or angularly offset relative to the x-axis by a polar angle (measured from the x-axis) less than thirty degrees (e.g., 25°) and the sixth plurality of periodic diffractive structures 210 may comprise a set of periodic linear grating structures rotated or angularly offset relative to the x-axis by a polar angle (measured from the x-axis) greater than sixty degrees (e.g., 65°). In another embodiment, the fourth set of periodic linear grating structures 206 are positioned generally parallel to an alternative axis that is not the y-axis, and further the fifth set of periodic linear grating structures 208 are rotated or angularly offset relative to an axis perpendicular to the alternative axis by a polar angle (measured from the perpendicular axis) less than thirty degrees (e.g., 25°) while the sixth set of periodic linear grating structures 210 are rotated or angularly offset relative to the alternative axis by a polar angle (measured from the perpendicular axis) greater than sixty degrees (e.g., 65°). In an example embodiment, the fifth set of periodic linear grating structures 208 are rotated or angularly offset relative to the x-axis by a polar angle of approximately 30° and the sixth set of periodic linear grating structures 210 are rotated or angularly offset relative to the x-axis by a polar angle of approximately 150°. The fifth and sixth sets of periodic diffractive structures 208, 210 are crossed and/or define different grating vectors. The fifth and sixth sets of periodic diffractive structures 208, 210 form a compound diffractive optic operable to replicate and out-couple image-bearing light from the second in-coupling diffractive optic IDO2. The fourth set of periodic diffractive structures 206 comprises a fourth period, the fifth set of periodic diffractive structures 208 comprise a fifth period, and the sixth set of periodic diffractive structures 210 comprise a sixth period. In an example embodiment, the sixth period is equal to the fifth period, and the fifth period is equal to the fourth period. In an example embodiment, the fourth period, the fifth period, and the sixth period are each less than 50 nm.

Figure 6:
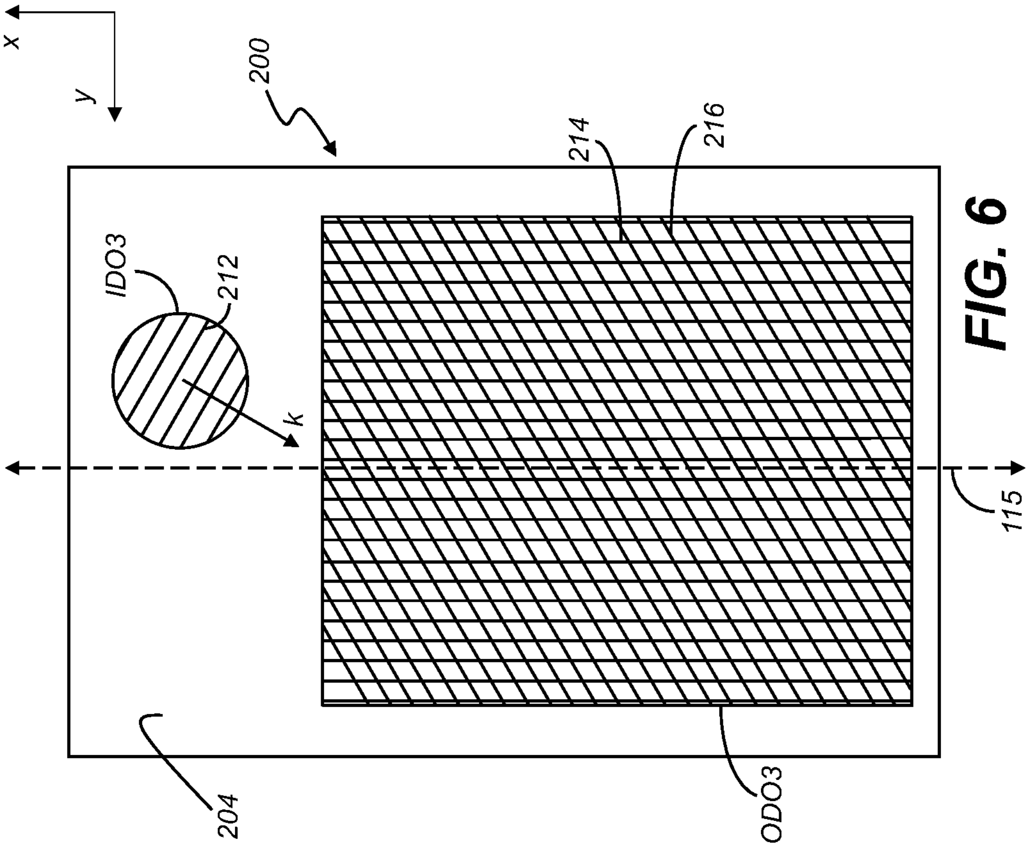
FIG. 6 shows a schematic bottom plan view of the second waveguide according to FIG. 3.

Referring now to FIG. 6, which illustrates a bottom plan view of second planar waveguide 200, the third in-coupling diffractive optic IDO3 includes a seventh plurality of periodic diffractive structures 212. For example, the third in-coupling diffractive optic IDO3 may comprise a seventh set of periodic linear grating structures 212 rotated or angularly offset relative to the fourth set of periodic linear grating structures 206 by approximately thirty degrees (30°) e.g., within five degrees (5°) of thirty degrees (30°). For example, the third in-coupling diffractive optic IDO3 may comprise the seventh set of periodic linear grating structures 212 rotated or angularly offset relative to the fourth set of periodic linear grating structures 206 by between 25 degrees (25°) and 35 degrees (30°). The third out-coupling diffractive optic ODO3 includes an eighth plurality of periodic diffractive structures 214 and a ninth plurality of periodic diffractive structures 216. For example, the eighth plurality of periodic diffractive structures 214 may comprise an eighth set of periodic linear grating structures 214 rotated or angularly offset relative to the fifth set of periodic linear grating structures 208 by approximately thirty degrees (30°), e.g., within five degrees (5°) of thirty degrees (30°), and the ninth plurality of periodic diffractive structures 216 may comprise a ninth set of periodic linear grating structures 216 rotated or angularly offset relative to the sixth set of periodic linear grating structures 210 by approximately thirty degrees (30°), e.g., within five degrees (5°) of thirty degrees (30°). In an example embodiment, the eighth set of periodic linear grating structures 214 is substantially parallel with the x-axis 115 having a polar angle of approximately 0° and the ninth set of periodic linear grating structures 216 is rotated or angularly offset relative to the x-axis 115 by a polar angle of approximately 120°. The eighth and ninth sets of periodic diffractive structures 214, 216 are crossed and/or define different grating vectors. The eighth and ninth sets of periodic diffractive structures 214, 216 form a compound diffractive optic operable to replicate and out-couple image-bearing light from the third in-coupling diffractive optic IDO3. The seventh set of periodic diffractive structures 212 comprises a seventh period, the eighth set of periodic diffractive structures 214 comprise an eighth period, and the ninth set of periodic diffractive structures 216 comprise a ninth period. In an example embodiment, the ninth period is equal to the eighth period, and the eighth period is equal to the seventh period. In an example embodiment, the seventh period, the eighth period and the ninth period are each less than 50 nm and the seventh period, the eighth period and the ninth period are each greater than 50 nm.

The first planar waveguide 100 comprises a first wavelength range light path and a second a wavelength range light path. The first wavelength range light path comprises at least the first in-coupling diffractive optic IDO1 and the first out-coupling diffractive optic ODO1. The first wavelength range light path is operable to in-couple, propagate via TIR, replicate and out-couple image-bearing light of a first wavelength range. For example, the first wavelength range light path is operable to direct image-bearing light in the blue wavelength range (e.g., in the 440-470 nm range, in the 440-495 nm range, or in the 450-495 nm range) through the waveguide 100.

The second planar waveguide 200 comprises a second wavelength range light path and a third wavelength range light path. The second wavelength range light path comprises at least the second in-coupling diffractive optic IDO2 and the second out-coupling diffractive optic ODO2. The second wavelength range light path is operable to in-couple, propagate via TIR, replicate and out-couple image-bearing light of a second wavelength range. For example, the second wavelength range light path is operable to direct image-bearing light in the green wavelength range (e.g., in the 520-560 nm range or 495-570 nm range) through the waveguide 200. The third wavelength range light path comprises at least the third in-coupling diffractive optic IDO3 and the third out-coupling diffractive optic ODO3. The third wavelength range light path is operable to in-couple, propagate via TIR, replicate and out-couple image-bearing light of a third wavelength range. For example, the third wavelength range light path is operable to direct image-bearing light in the red wavelength range (e.g., in the 630-660 nm range or 620-750 nm range) through the waveguide 200.

Crosstalk can be reduced between the second and third wavelength range light paths by rotating the seventh plurality of periodic diffractive structures 212 generally thirty degrees (30°) relative to the fourth plurality of periodic diffractive structures 206, and by rotating the eighth and ninth pluralities of grating structures 214, 216 generally thirty degrees (30°) relative to the fifth and sixth pluralities of periodic diffractive structures 208, 210, respectively. In other words, the third in-coupling diffractive optic IDO3 is rotated generally thirty degrees (30°) relative to the second in-coupling diffractive optic IDO2, and the third out-coupling diffractive optic ODO3, is rotated generally thirty degrees (30°) relative to the second out-coupling diffractive optic ODO2.

Figure 3:
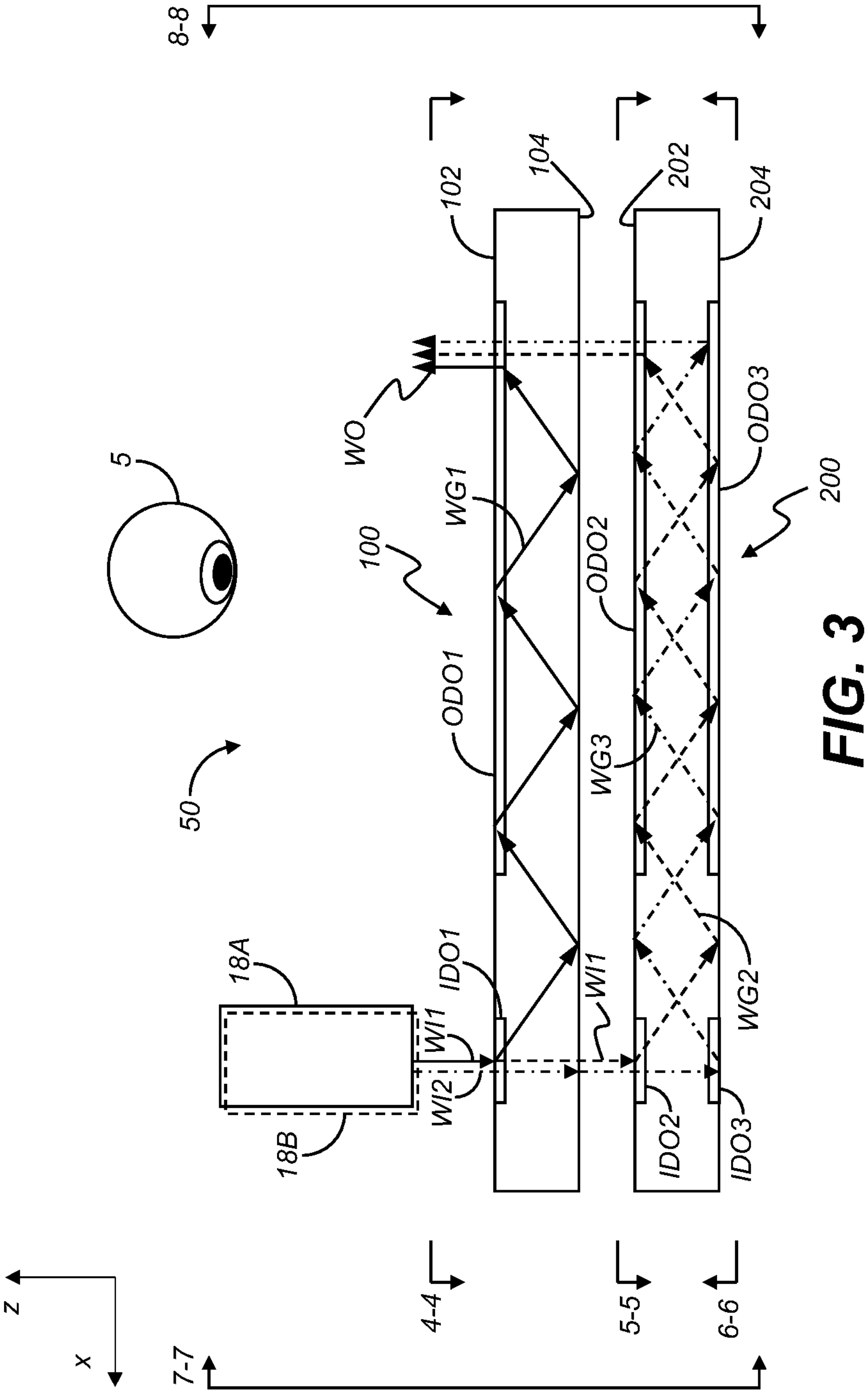
FIG. 3 shows a schematic side view of stacked waveguides having multiple in-coupling diffractive optics according to an exemplary embodiment of the presently disclosed subject matter.
Figure 8:
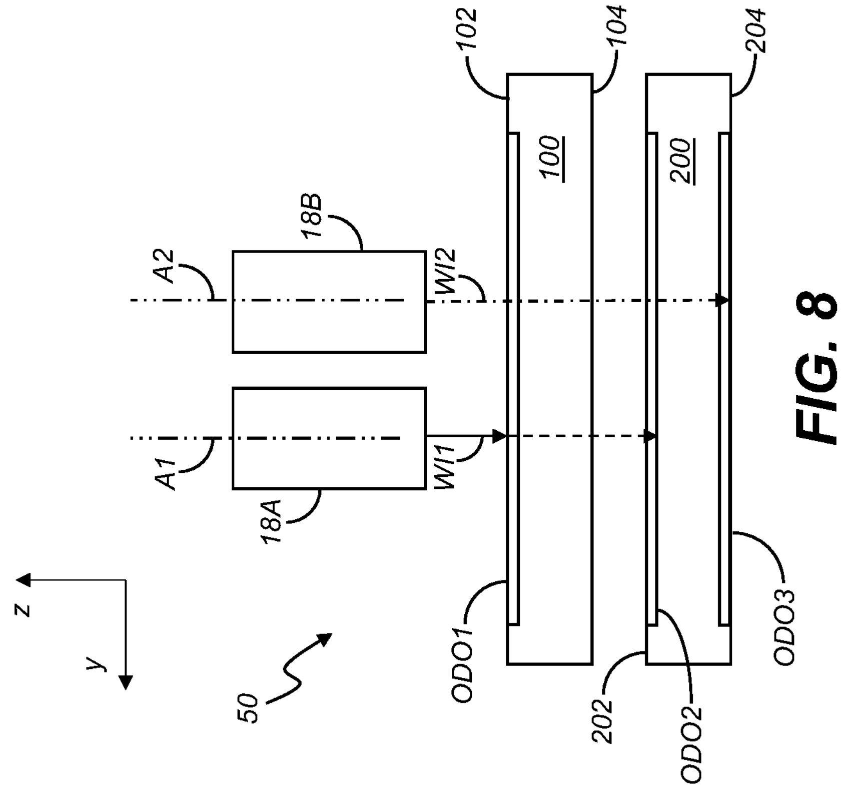
FIG. 8 shows a schematic end view of the stacked waveguide according to FIG. 3.
Figure 7:
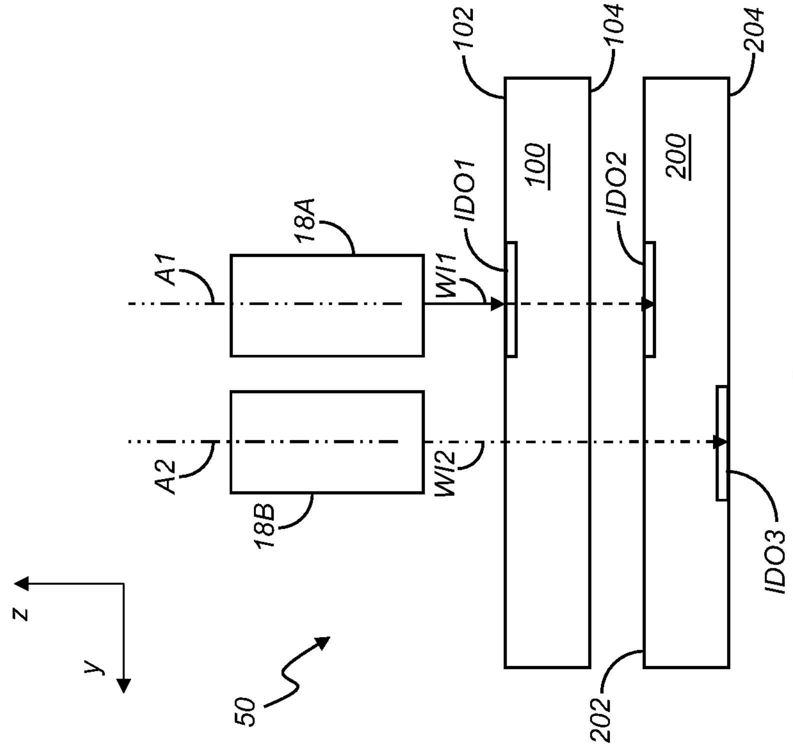
FIG. 7 shows a schematic end view of the stacked waveguides according to FIG. 3.
Figure 9:
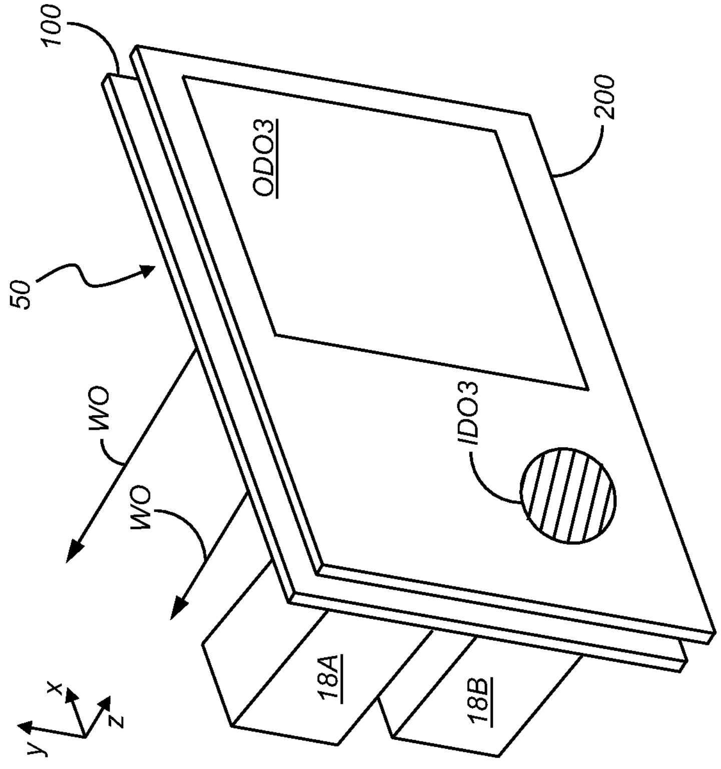
FIGS. 9 and 10 show schematic perspective views of the stacked waveguides according to FIG. 3.
Figure 10:
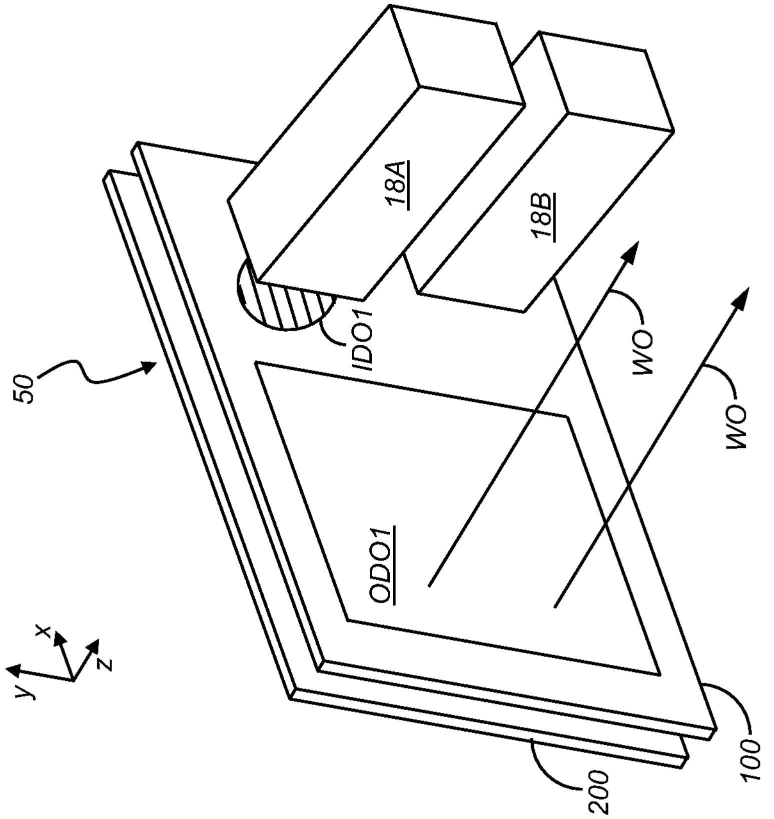

As illustrated in FIGS. 3, 7, and 8, in an example embodiment, image-bearing light WI1 from the projector 18A is incident upon the first in-coupling diffractive optic IDO1, a first portion of the image-bearing light WI1 is diffracted by the first in-coupling diffractive optic IDO1 and generally propagates toward the out-coupling diffractive optic ODO1 via TIR as WG1. In one example, the periodic linear grating structures of first in-coupling diffractive optic IDO1 (i.e., first set of periodic linear grating structures 106), are arranged to optimize coupling of a first range of wavelengths of image-bearing light WI1, e.g., light within the blue wavelength range of the electromagnetic spectrum. A second portion of the image-bearing light WI1 transmits through the first in-coupling diffractive optic IDO1 and the planar waveguide 100 and is incident upon the second in-coupling diffractive optic IDO2. At least a portion of the image-bearing light WI1 is diffracted by the second in-coupling diffractive optic IDO2 and generally propagates toward the second out-coupling diffractive optic ODO2 via TIR as WG2. In one example, the periodic linear grating structures of second in-coupling diffractive optic IDO2 (i.e., fourth set of periodic linear grating structures 206) are arranged to optimized coupling of a second range of wavelengths of image-bearing light WI1, e.g., light within the green wavelength range.

Image-bearing light WI2 from the projector 18B is incident upon the second in-coupling diffractive optic IDO2, a first portion of the image-bearing light WI2 is diffracted by the second in-coupling diffractive optic IDO2 and generally propagates toward the out-coupling diffractive optic ODO2 via TIR as WG3. In one example, the periodic linear grating structures of the third in-coupling diffractive optic IDO3 (i.e., periodic linear grating structures 212), are arranged to optimize coupling of a range of wavelengths of image-bearing light WI2 within the red wavelength range.

Figure 11:
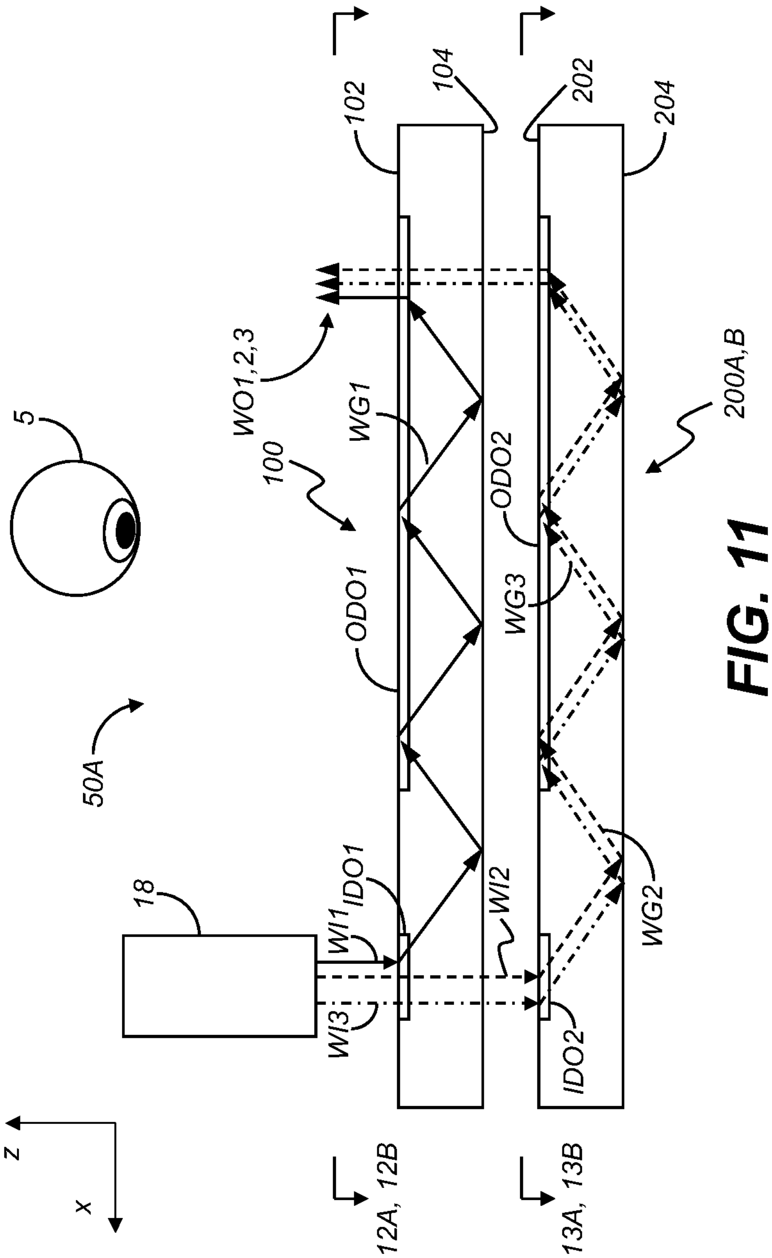
FIG. 11 shows a schematic side view of stacked waveguides according to an exemplary embodiment of the presently disclosed subject matter.
Figure 12B:
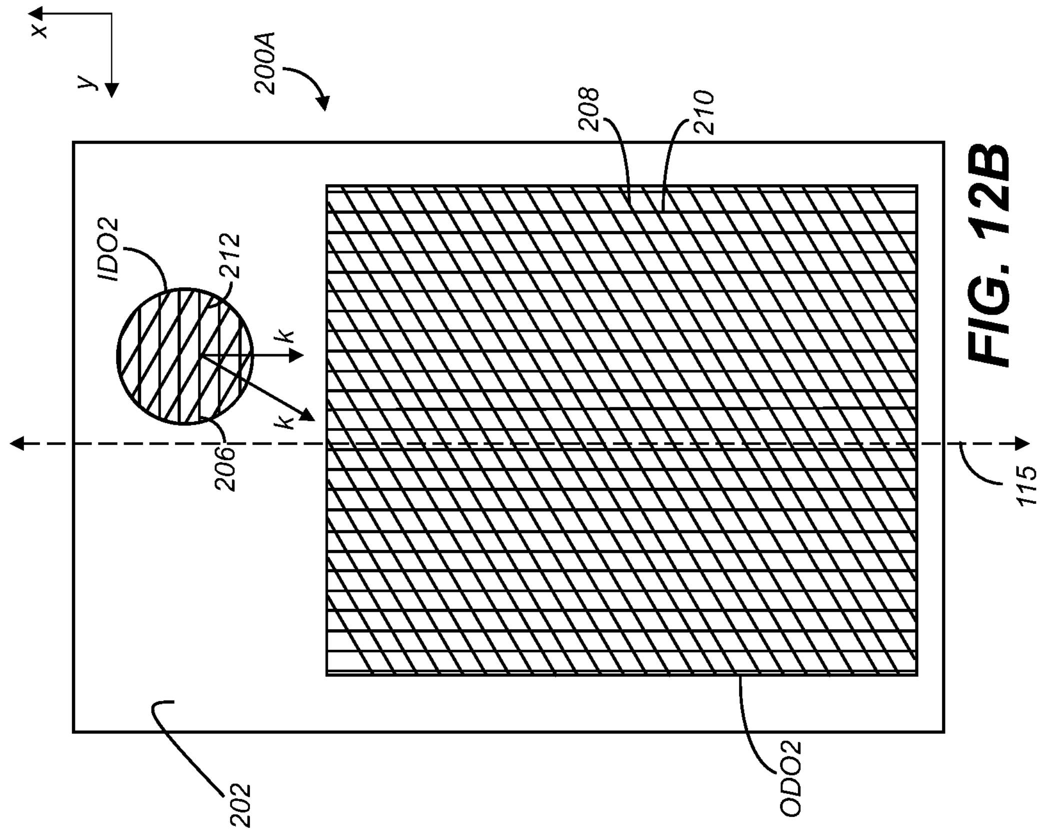
FIG. 12B shows a schematic top plan view of a second waveguide according to FIG. 11.
Figure 12A:
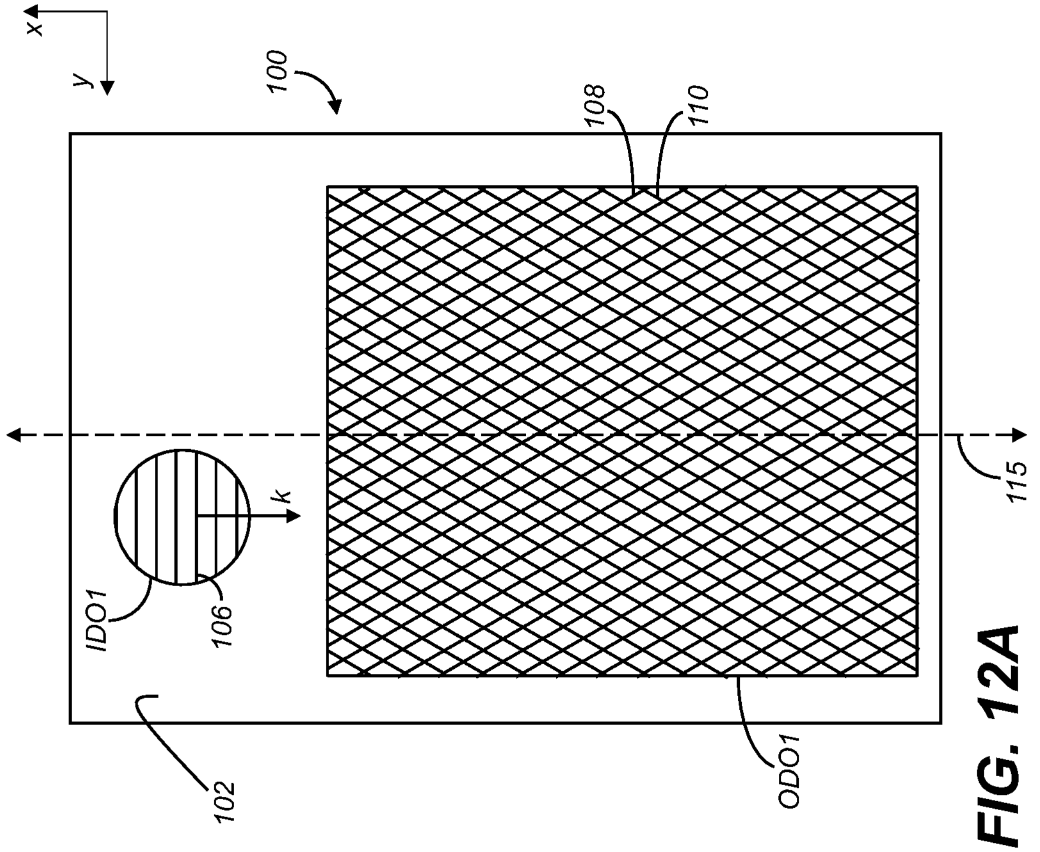
FIG. 12A shows a schematic top plan view of a first waveguide according to FIG. 11.

In an example embodiment, as illustrated in FIGS. 11-12B, an image light guide system 50A includes a second planar waveguide 200A having a second in-coupling diffractive optic IDO2 located on, in, or engaged with the first surface 202 and a second out-coupling diffractive optic ODO2 formed on, in, or engaged with the first surface 202. It should be appreciated that second in-coupling diffractive optic IDO2 and the second out-coupling diffractive optic ODO2 can be formed, on, in, or engaged with either the first surface 202 or the second surface 204. The second in-coupling diffractive optic IDO2 and the second out-coupling diffractive optic ODO2 are arranged and optimized to diffract image-bearing light of both a second wavelength range (e.g., the green wavelength range in the 520-560 nm range or 495-570 nm range) and a third wavelength range (e.g., the red wavelength range in the 630-660 nm range or 620-750 nm range). The second out-coupling diffractive optic ODO2 is arranged to replicate image-bearing light of the second and third wavelength ranges in at least one direction and out-couple image-bearing light of the second and third wavelength ranges.

Figure 13B:
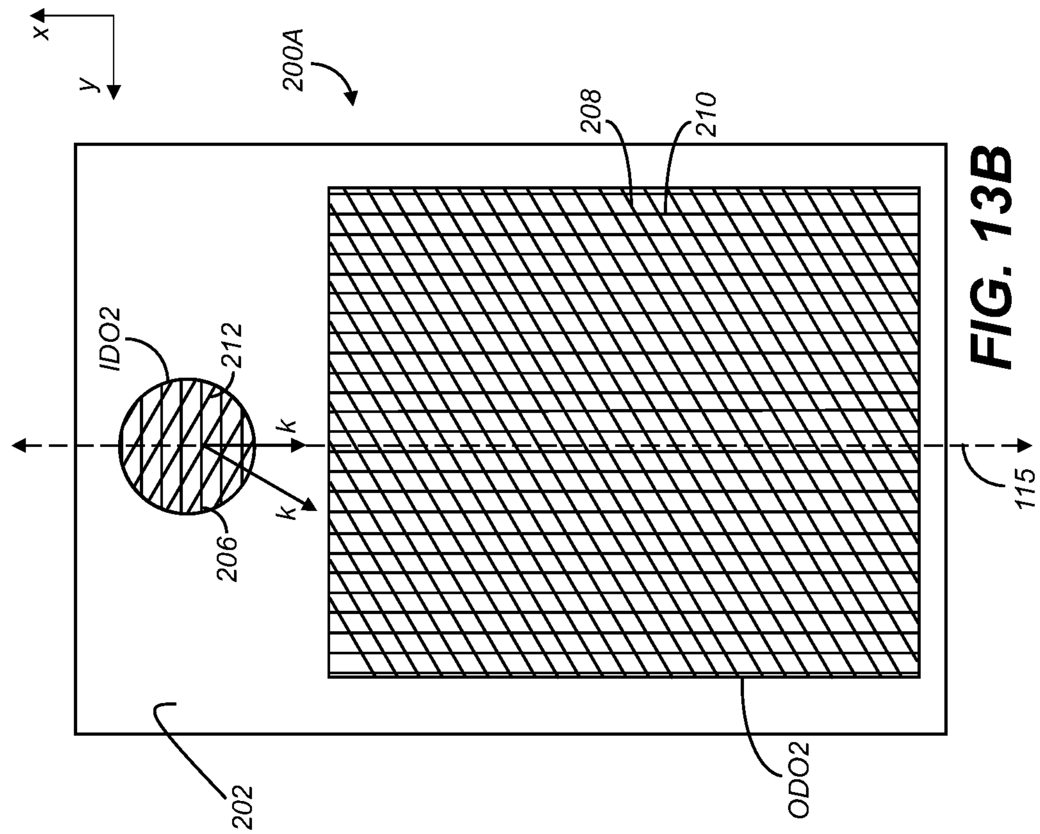
FIG. 13B shows a schematic top plan view of a second waveguide according to FIG. 11.
Figure 13A:
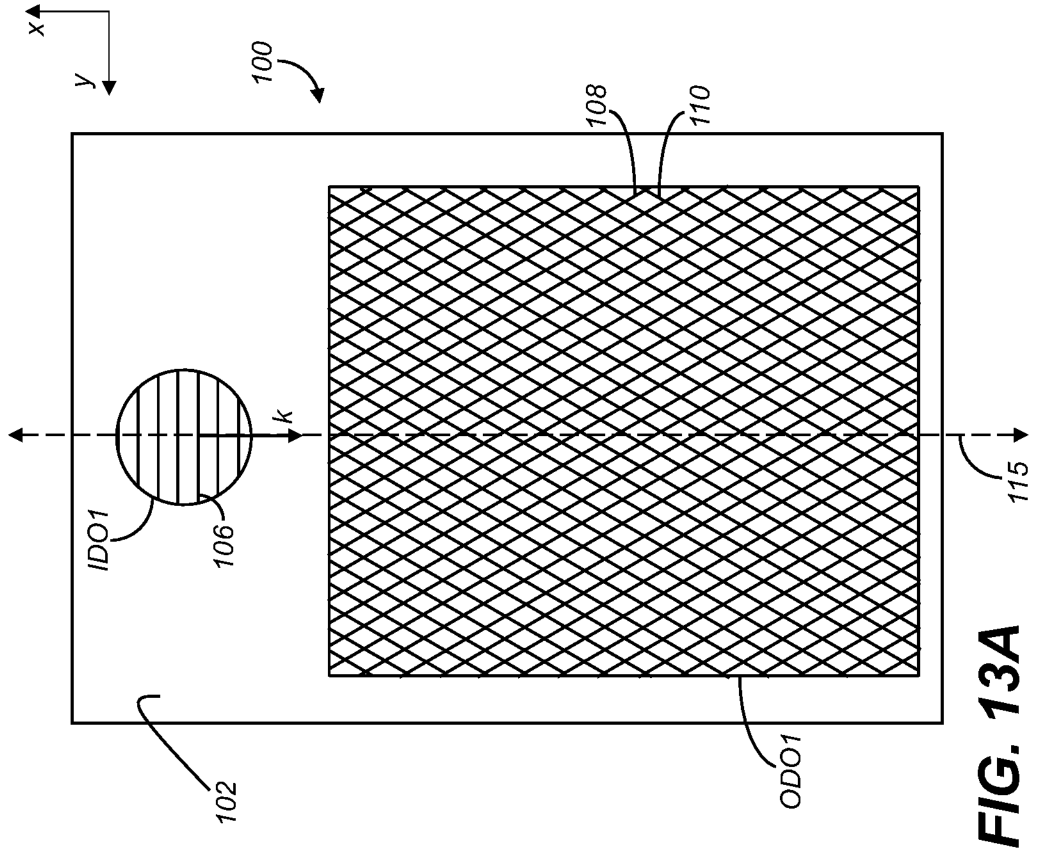
FIG. 13A shows a schematic top plan view of a first waveguide according to FIG. 11.

In an example embodiment, as illustrated in FIGS. 11 and 13A-13B, the second in-coupling diffractive optic IDO2 is located substantially co-axial with the first in-coupling diffractive optic IDO1 with respect to an imaginary axis arranged through the first and second surface 102, 104 of the first planar waveguide 100 and through the first and second surface 202, 204 of the second planar waveguide 200A. In an example embodiment, the second in-coupling diffractive optic IDO2 includes a first plurality of periodic diffractive structures 206 optimized to diffract image-bearing light of the second wavelength range into the second waveguide 200A and a second plurality of periodic diffractive structures 212 optimized to diffract image-bearing light of the third wavelength range into the second waveguide 200A. For example, the second in-coupling diffractive optic IDO2 may be a compound diffractive optic having a plurality of periodic diffractive structures comprising, for example, posts.

The second in-coupling diffractive optic IDO2 may also be a compound diffractive optic having a plurality of crossed or overlapping generally linear periodic diffractive structures. In an example embodiment, the second in-coupling diffractive optic IDO2 includes a plurality of periodic diffractive structures optimized to diffract image-bearing light of both the second and third wavelength ranges into the second waveguide 200A. For example, the second in-coupling diffractive optic IDO2 may define only one grating vector k. It should be appreciated that, in an example embodiment, the image light guide system 50A may be configured such that the second waveguide 200A is utilized to convey only the image-bearing light of the second wavelength range.

Figure 15:
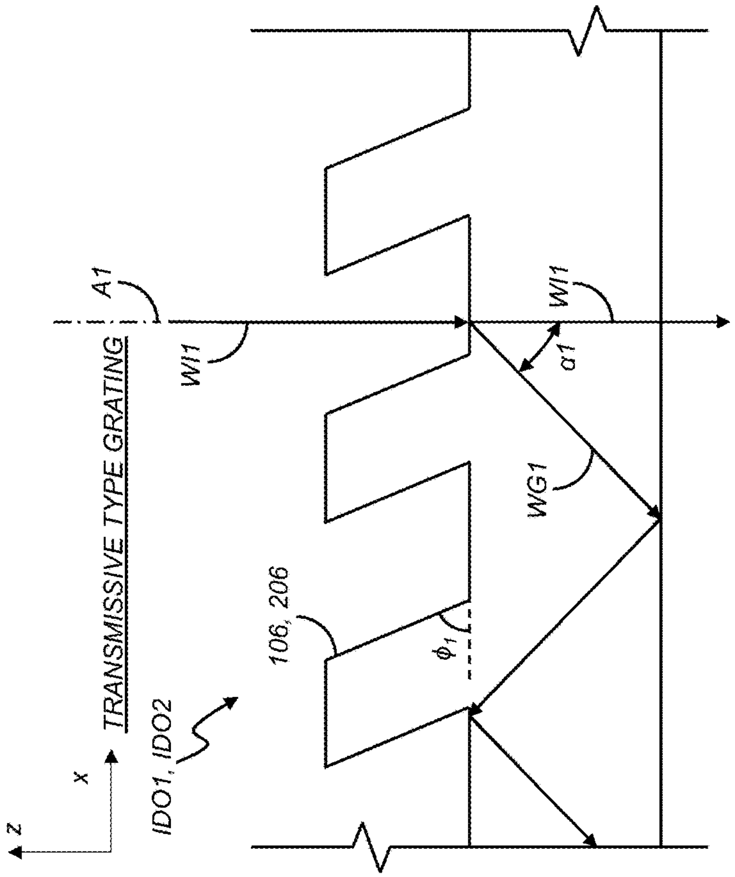
FIG. 15 shows a schematic side view of a portion of a transmissive type in-coupling diffractive optic.
Figure 14:
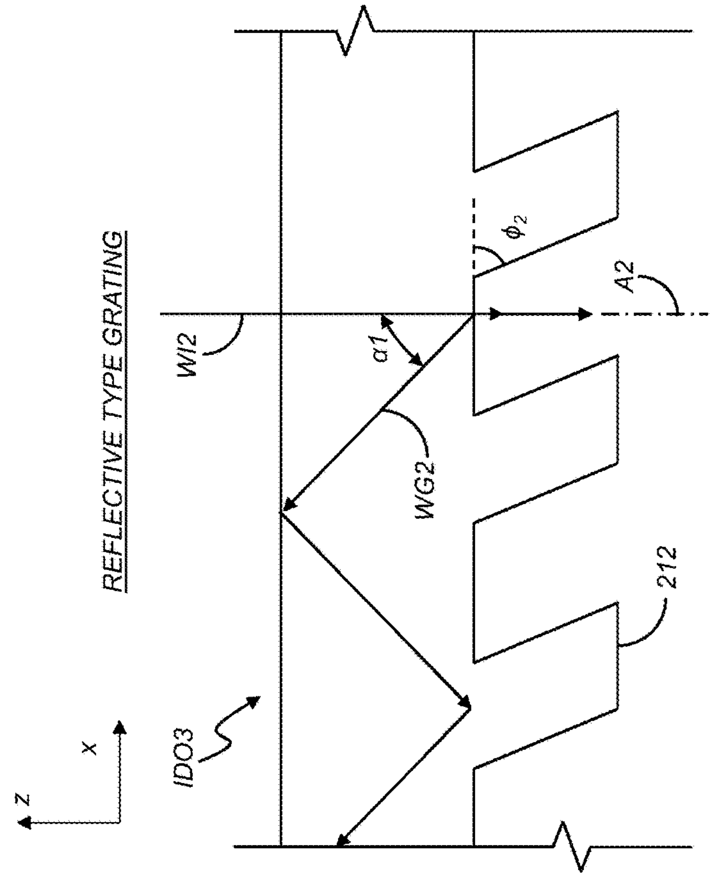
FIG. 14 shows a schematic side view of a portion of a reflective type in-coupling diffractive optic.

In an example embodiment, as illustrated in FIGS. 14 and 15, the first in-coupling diffractive optic IDO1 and the second in-coupling diffractive optic IDO2 are configured to optimize diffractive efficiency for image-bearing light WI1. For example, the first in-coupling diffractive optic IDO1 and the second in-coupling diffractive optic IDO2 may be configured as transmissive-type diffraction gratings and the second in-coupling diffractive optic IDO2 and the third in-coupling diffractive optic IDO3 may be configured as reflective-type diffraction gratings. In an example embodiment, the first plurality of periodic diffractive structures 106 of the first in-coupling diffractive optic IDO1 and the fourth plurality of periodic diffractive structures 206 of the second in-coupling diffractive optic IDO2 may have a slant angle $\phi_1$ and the seventh plurality of periodic diffractive structures 212 of the third in-coupling diffractive optic IDO3 may have a slant angle $\phi_2$. The periodic diffractive structures 106, 206 of the first and second in-coupling diffractive optics IDO1, IDO2 may have slant angles $\phi$ that are rotated one-hundred-eighty degrees relative to each other.

In an example embodiment, the first planar waveguide 100 comprises a low refractive index material (e.g., polymer, quartz, or glass) optimized for propagating image-bearing light in the blue wavelength range (e.g., in the 440-470 nm range or between 420-495 nm range) and the second planar waveguide 200 comprises a high refractive index material (e.g., polymer, quartz, or glass) optimized for propagating image-bearing light in the green wavelength range (e.g., in the 520-560 nm range or 495-570 nm range) and the red wavelength range (e.g., in the 630-660 nm range or 620-750 nm range). For example, a low refractive index material may have a refractive index number in the range of 1.2-1.8 and a high refractive index material may have a refractive index number in the range of 1.8-2.0. In some examples, a low refractive index material may have a refractive index number in the range of 1.4-1.7. In some examples, the low refractive index material has a refractive index of less than 1.8 and the high refractive index material has a refractive index greater than or equal to 1.8.

The second planar waveguide 200 comprising a high refractive index material has the advantage of supporting a wider spectral bandwidth such that image-bearing light in the green wavelength range (e.g., in the 520-560 nm range or 495-570 nm range) and the red wavelength range (e.g., in the 630-660 nm range or 620-750 nm range) can be conveyed via TIR to the eyebox in a single waveguide. Similarly, the second planar waveguide 200 comprising a high refractive index material has the advantage of supporting a wider field of view (FOV) as compared to a low refractive index material due to Snell's Law.

High refractive index polymers utilized in optical waveguide substrates are conventionally achieved by mixing high refractive index nano-particles into a bulk polymer material, thereby raising the overall refractive index of the bulk polymer. While waveguides manufactured with this type of high refractive index polymer generally function with acceptable performance for green and red wavelength ranges of light, the blue wavelength range of light (having shorter wavelengths than green and red wavelength ranges of light) tends to scatter off of the nano-particles mixed into the bulk polymer material, thereby negatively affecting performance. In other high refractive index materials, such as, without limitation, high refractive index glass having a refractive index in the range of 1.9-2.0, a blue wavelength range of light is often attenuated. For example, an optical path of a blue wavelength range of light within a waveguide comprising a high refractive index glass can be long enough that substantially no light in the blue wavelength range is emitted to an eyebox. The attenuation of the blue wavelength range of light in a high refractive index material is a function of the particular wavelength of light and the particular material.

In view of the foregoing, the presently disclosed subject matter has the advantage of providing diffraction and propagation of multiple wavelength ranges of light in an image light guide under optimal conditions for each wavelength range to produce improved virtual image brightness and resolution. In addition, an image light guide system arranged to convey full color virtual images to an eyebox with only two waveguides is superior to a system utilizing three waveguides (one waveguide for each of the red, green, and blue wavelength ranges of light) because of reduced weight and complexity of the system, and also because the potential diffractive effects in an image resulting from viewing the image through a diffractive optic (e.g., an out-coupling diffractive optic) are reduced relative to a three waveguide stack.

Figure 16:
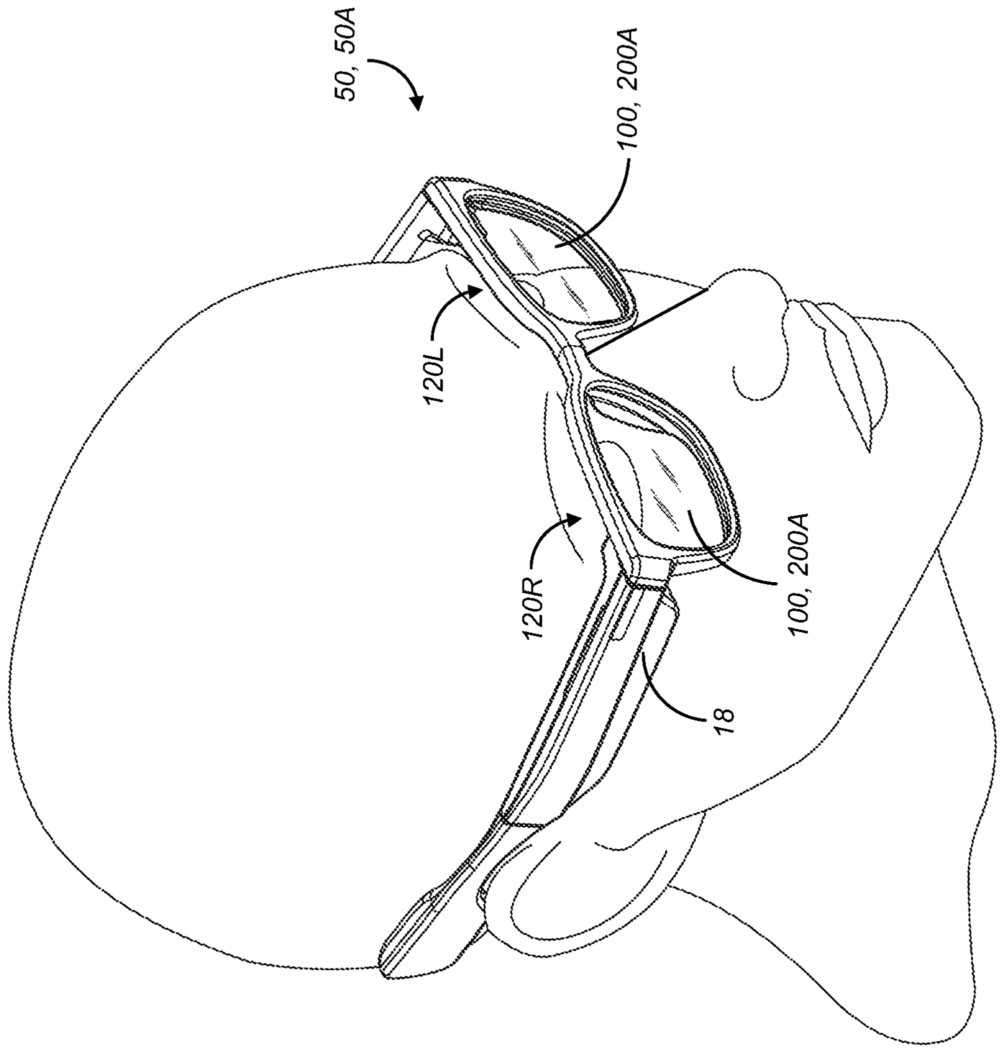
FIG. 16 shows a perspective view of a display system for augmented reality viewing using imaging light guides according to an exemplary embodiment of the presently disclosed subject matter.

The perspective view shown in FIG. 16 illustrates one example of image light guide system 50, 50A in a display system for augmented reality viewing of virtual images. The image light guide system 50, 50A uses one or more waveguide stacks 100, 200; 100, 200A. Image light guide system 50, 50A is shown as a head-mounted display (HMD) with a right-eye optical system 120R having a waveguide stack 100, 200A proximate the user's right eye. The image light guide system 50, 50A includes image source 18, such as a pico-projector or similar device, energizable to generate one or more polychromatic virtual images. In one example, image light guide system 50, 50A includes a left-eye optical system 120L having one or more waveguide stacks 100, 200; 100, 200A and a second image source. In examples using a right-eye optical system 120R and a left eye-optical system 120L, the virtual images that are generated can be a stereoscopic pair of images for three-dimensional (3D) viewing. During operation by a user, the virtual image or images formed by the image light guide system 50, 50A can appear to be superimposed or overlaid onto the real-world scene content seen by the viewer through the right eye optical system 120R and/or left eye image light guide. Additional components familiar to those skilled in the augmented reality visualization arts, such as one or more cameras mounted on the frame of the HMD for viewing scene content or viewer gaze tracking, can also be provided.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An image light guide system for conveying a virtual image, comprising:
- a first waveguide having a first refractive index;
- a first in-coupling diffractive optic formed along the first waveguide, wherein the first in-coupling diffractive optic is arranged to diffract image-bearing light beams of a first wavelength range into the first waveguide in an angularly encoded form;
- a first out-coupling diffractive optic formed along the first waveguide, wherein the first out-coupling diffractive optic is arranged to replicate the image-bearing light beams of the first wavelength range in at least one direction and direct the replicated image-bearing light beams from the first waveguide in an angularly decoded form;
- a second waveguide having a second refractive index;
- a second in-coupling diffractive optic formed along the second waveguide, wherein the second in-coupling diffractive optic is arranged to diffract image-bearing light beams of a second wavelength range into the second waveguide in an angularly encoded form;
- a second out-coupling diffractive optic formed along the second waveguide, wherein the second out-coupling diffractive optic is arranged to replicate the image-bearing light beams of the second wavelength range in at least one direction and direct the replicated image-bearing light beams from the second waveguide in an angularly decoded form;
- a third in-coupling diffractive optic formed along the second waveguide, wherein the third in-coupling diffractive optic is arranged to diffract image-bearing light beams of a third wavelength range into the second waveguide in an angularly encoded form; and
- a third out-coupling diffractive optic formed along the second waveguide, wherein said third out-coupling diffractive optic is arranged to replicate the image-bearing light beams of the third wavelength range in at least one direction and direct the replicated image-bearing light beams from the second waveguide in an angularly decoded form.

2. The image light guide system of claim 1, wherein the first waveguide is arranged substantially parallel with the second waveguide along a first axis, and wherein the first in-coupling diffractive optic and the second in-coupling diffractive optic are located substantially coaxial along a second axis that is substantially orthogonal to the first axis.

3. The image light guide system of claim 1, wherein the image-bearing light beams of the first wavelength range comprise a shorter wavelength than the image-bearing light beams of the second wavelength range.

4. The image light guide system of claim 1, wherein the image-bearing light beams of the third wavelength range comprise a longer wavelength than the image-bearing light beams of the first wavelength range.

5. The image light guide system of claim 1, further comprising a first image source operable to emit the image-bearing light beams of the first and second wavelength ranges, and a second image source operable to emit the image-bearing light beams of the third wavelength range.

6. The image light guide system of claim 1, wherein the first refractive index is smaller than the second refractive index.

7. The image light guide system of claim 1, wherein the first refractive index is less than 1.8 and the second refractive index is greater than or equal to 1.8.

8. An image light guide system for conveying a virtual image, comprising:
- a first waveguide having a first refractive index;
- a first in-coupling diffractive optic formed along the first waveguide, wherein the first in-coupling diffractive optic is arranged to diffract image-bearing light beams of a first wavelength range into the first waveguide in an angularly encoded form;
- a first out-coupling diffractive optic formed along the first waveguide, wherein the first out-coupling diffractive optic is arranged to replicate the image-bearing light beams of the first wavelength range in at least one direction and direct the replicated image-bearing light beams from the first waveguide in an angularly decoded form;
- a second waveguide having a second refractive index;
- a second in-coupling diffractive optic formed along the second waveguide, wherein the second in-coupling diffractive optic is arranged to diffract image-bearing light beams of at least a second wavelength range into the second waveguide in an angularly encoded form;
- a second out-coupling diffractive optic formed along the second waveguide, wherein the second out-coupling diffractive optic is arranged to replicate the image-bearing light beams of the second wavelength range in at least one direction and direct the replicated image-bearing light beams from the second waveguide in an angularly decoded form.

9. The image light guide system of claim 8, wherein the first waveguide is arranged substantially parallel with the second waveguide along a first axis, and wherein the first in-coupling diffractive optic and the second in-coupling diffractive optic are located substantially coaxial along a second axis that is substantially orthogonal to the first axis.

10. The image light guide system of claim 8, wherein the image-bearing light beams of the first wavelength range comprise a shorter wavelength than the image-bearing light beams of the second wavelength range.

11. The image light guide system of claim 8, wherein the second in-coupling diffractive optic is arranged to diffract image-bearing light beams of a third wavelength range into the second waveguide in an angularly encoded form; and wherein the second out-coupling diffractive optic is arranged to replicate the image-bearing light beams of the third wavelength range in at least one direction and direct the replicated image-bearing light beams from the second waveguide in an angularly decoded form.

12. The image light guide system of claim 11, wherein the image-bearing light beams of the third wavelength range comprise a longer wavelength than the image-bearing light beams of the first wavelength range.

13. The image light guide system of claim 11, further comprising a first image source operable to emit the image-bearing light beams of the first and second wavelength ranges, and a second image source operable to emit the image-bearing light beams of the third wavelength range.

14. The image light guide system of claim 8, wherein the first refractive index is smaller than the second refractive index.

15. The image light guide system of claim 14, wherein the first wavelength range is between 440-495 nm.

16. The image light guide system of claim 8, wherein the first refractive index is less than 1.8 and the second refractive index is greater than or equal to 1.8.

* * * * *